United States Patent
Jacques de Kadt et al.

(10) Patent No.: US 10,423,459 B1
(45) Date of Patent: Sep. 24, 2019

(54) RESOURCE MANAGER

(71) Applicant: Amazon Technologies, Inc., Seattle, WA (US)

(72) Inventors: Christopher Richard Jacques de Kadt, Seattle, WA (US); Benjamin Warren Mercier, Seattle, WA (US); Carlos Vara Callau, Seattle, WA (US); Timothy Daniel Cole, Seattle, WA (US); Aaron Gifford Freshwater, Seattle, WA (US); Sayantan Chakravorty, Sammamish, WA (US); Allan Henry Vermeulen, Corvallis, OR (US)

(73) Assignee: Amazon Technologies, Inc., Seattle, WA (US)

(*) Notice: Subject to any disclaimer, the term of this patent is extended or adjusted under 35 U.S.C. 154(b) by 143 days.

(21) Appl. No.: 15/275,302

(22) Filed: Sep. 23, 2016

(51) Int. Cl.
   G06F 9/46 (2006.01)
   G06F 9/50 (2006.01)

(52) U.S. Cl.
   CPC .............. G06F 9/5061 (2013.01); G06F 9/50 (2013.01); *G06F 9/5027* (2013.01)

(58) Field of Classification Search
   CPC ........ G06F 9/50; G06F 9/5011; G06F 9/5016; G06F 9/5027; G06F 9/5044; G06F 9/5055; G06F 9/5061
   See application file for complete search history.

(56) References Cited

U.S. PATENT DOCUMENTS

| | | | |
|---|---|---|---|
| 6,732,124 B1 | 5/2004 | Koseki et al. | |
| 7,257,690 B1 | 8/2007 | Baird | |
| 7,386,850 B2* | 6/2008 | Mullen | H04Q 3/64 379/265.01 |
| 8,612,330 B1* | 12/2013 | Certain | G06Q 30/06 705/37 |
| 9,055,067 B1* | 6/2015 | Ward, Jr. | H04L 67/10 |

(Continued)

OTHER PUBLICATIONS

"Amazon Kinesis Streams," © 2016 Amazon Web Services, Inc., <https://aws.amazon.com/kinesis/streams/> [retrieved Sep. 15, 2016], 6 pages.

(Continued)

*Primary Examiner* — Hiren P Patel
(74) *Attorney, Agent, or Firm* — Davis Wright Tremaine LLP

(57) ABSTRACT

A resource manager arranges the resources in a computer system into one or more resource pools. The resource manager allocates a number of active resources and a number of backup resources to a particular resource pool. For each resource managed by the resource manager, the resource manager acquires information that describes the capacity and reliability of the resource. Capacity and reliability information for the particular resource pool is determined based on the capacity and reliability information associated with the resources assigned to the pool. In response to a request, the resource manager may provide an application with resources from several resource pools. The likelihood that the resource manager will be able to provide sufficient resources to the application may be determined based at least in part on the reliability information associated with the several resource pools.

20 Claims, 14 Drawing Sheets

(56) References Cited

U.S. PATENT DOCUMENTS

| | | | |
|---|---|---|---|
| 9,230,000 | B1 | 1/2016 | Hsieh et al. |
| 9,400,607 | B1 | 7/2016 | Daud et al. |
| 9,423,978 | B2 | 8/2016 | Long et al. |
| 9,465,630 | B1* | 10/2016 | Muniz .................... G06F 9/455 |
| 9,466,036 | B1* | 10/2016 | Vicaire ................. G06F 9/5027 |
| 9,479,567 | B1 | 10/2016 | Koorapati et al. |
| 9,495,196 | B2 | 11/2016 | Anderson et al. |
| 9,571,573 | B1 | 2/2017 | Koorapati et al. |
| 9,734,157 | B1 | 8/2017 | Brahma Raju et al. |
| 9,824,114 | B1 | 11/2017 | Steinke et al. |
| 9,852,147 | B2 | 12/2017 | von Muhlen et al. |
| 9,858,301 | B1 | 1/2018 | Hardy et al. |
| 9,959,357 | B2 | 5/2018 | Goel et al. |
| 9,985,848 | B1* | 5/2018 | Ward, Jr. ............ H04L 41/5045 |
| 9,990,391 | B1 | 6/2018 | Cole et al. |
| 2003/0055983 | A1 | 3/2003 | Callegari |
| 2003/0061565 | A1 | 3/2003 | Brendle |
| 2005/0021836 | A1 | 1/2005 | Reed et al. |
| 2006/0041505 | A1 | 2/2006 | Enyart |
| 2006/0184381 | A1 | 8/2006 | Rice et al. |
| 2007/0033436 | A1 | 2/2007 | Kingsbury et al. |
| 2007/0038714 | A1 | 2/2007 | Sell |
| 2007/0143767 | A1* | 6/2007 | Attanasio .............. G06F 9/5061 718/104 |
| 2007/0192261 | A1* | 8/2007 | Kelkar ...................... G06F 9/50 706/1 |
| 2007/0266037 | A1 | 11/2007 | Terry et al. |
| 2007/0271422 | A1 | 11/2007 | Osaki |
| 2008/0046443 | A1 | 2/2008 | Fachan et al. |
| 2008/0071853 | A1 | 3/2008 | Mosier et al. |
| 2009/0132671 | A1 | 5/2009 | Chkodrov et al. |
| 2009/0133039 | A1 | 5/2009 | Chkodrov et al. |
| 2010/0058349 | A1* | 3/2010 | Diwakar ............... G06F 9/5044 718/104 |
| 2010/0262860 | A1* | 10/2010 | Sargor .................. G06F 9/5083 714/4.1 |
| 2011/0295722 | A1 | 12/2011 | Reisman |
| 2012/0084113 | A1* | 4/2012 | Brandwine ...... G06Q 10/06312 705/7.22 |
| 2012/0084443 | A1* | 4/2012 | Theimer ............. G06F 9/45533 709/226 |
| 2012/0179476 | A1 | 7/2012 | Muncy |
| 2012/0221525 | A1* | 8/2012 | Gold .................. G06F 11/1458 707/644 |
| 2012/0323644 | A1 | 12/2012 | Custer |
| 2013/0018963 | A1 | 1/2013 | Brauff et al. |
| 2013/0042005 | A1* | 2/2013 | Boss ..................... G06F 9/5011 709/226 |
| 2013/0091282 | A1* | 4/2013 | Tontiruttananon .... G06F 9/5061 709/226 |
| 2013/0111261 | A1 | 5/2013 | Dalton |
| 2013/0198319 | A1* | 8/2013 | Shen ..................... G06F 9/5077 709/217 |
| 2013/0212285 | A1* | 8/2013 | Hoffmann ........... H04L 12/4641 709/226 |
| 2014/0280956 | A1* | 9/2014 | Shu ..................... H04L 67/1004 709/226 |
| 2014/0282586 | A1* | 9/2014 | Shear ................... G06F 9/5072 718/104 |
| 2015/0006733 | A1* | 1/2015 | Khan ...................... H04L 47/70 709/226 |
| 2015/0040131 | A1* | 2/2015 | Shan ................... G06F 9/5027 718/1 |
| 2015/0058557 | A1 | 2/2015 | Madhusudana et al. |
| 2015/0248253 | A1* | 9/2015 | Kim ...................... G06F 3/0611 707/723 |
| 2015/0277987 | A1* | 10/2015 | Di Balsamo .......... G06F 9/5083 718/104 |
| 2015/0347245 | A1* | 12/2015 | Andre .................. G06F 11/203 714/6.3 |
| 2015/0347252 | A1* | 12/2015 | Andre .................. G06F 11/008 714/6.3 |
| 2016/0253195 | A1* | 9/2016 | Banzhaf ................ G06F 9/5077 718/1 |
| 2016/0292179 | A1 | 10/2016 | von Muhlen et al. |
| 2016/0357610 | A1* | 12/2016 | Bartfai-Walcott .... G06F 9/5027 |
| 2017/0111445 | A1* | 4/2017 | Kunde ................ H04L 67/1014 |
| 2017/0257322 | A1* | 9/2017 | Nagao ..................... H04L 67/12 |
| 2017/0286517 | A1 | 10/2017 | Horowitz et al. |
| 2018/0026852 | A1* | 1/2018 | Anderson ............. H04L 41/147 709/224 |

OTHER PUBLICATIONS

Kreps, J., "The Log: What Every Software Engineer Should Know About Real-Time Data's Unifying Abstraction," Linkedin.com, Dec. 16, 2013, https://engineering.linkedin.com/distributed-systems/log-what-every-software-engineer-sh . . . > [retrieved Sep. 15, 2016], 29 pages.

"Leader Election Pattern," © 2016 Microsoft, <https://msdn.microsoft.com/en-us/library/dn568104(d=printer).aspx> [retreived Sep. 15, 2016], 8 pages.

* cited by examiner

Application Resource Table 600

| Application Name | Capacity Requirement | Reliability Requirement | Resource Pools |
|---|---|---|---|
| Widget | 5433 | 3453 | 54,15,8 |
| ReportGen | 5345 | 4521 | 43,23,8 |
| Monitor | 3452,2342,4233 | 43 | 1,2,3 |
| StatMon | 342 | 15456 | 10 |
| QUpdate | 343 | 734 | 15 |
| NetStat | 523 | 3235 | 20,21,22 |

Resource Pool Table

| Resource Pool ID | Resource Type | Pool Reliability | Active Capacity | Capacity Requirement | Reliability Requirement |
|---|---|---|---|---|---|
| 1 | Memory | 523 | 5626 | 3452 | 212 |
| 2 | Storage | 2995 | 15456 | 2342 | 1233 |
| 3 | Processor | 546 | 3453 | 4233 | 784 |
| 4 | Network | 2345 | 2352 | 234 | 823 |
| 5 | Processor | 2342 | 3533 | 23423 | 342 |
| 6 | Cryptography | 323 | 5424 | 23342 | 0 |

FIG. 6

Resource Pool Table 700

| Resource Pool ID | Resource Type | Pool Reliability | Active Capacity | Capacity Requirement | Reliability Requirement |
|---|---|---|---|---|---|
| 1 | Memory | 523 | 5626 | 3452 | 212 |
| 2 | Storage | 2995 | 15456 | 2342 | 1233 |
| 3 | Processor | 1546 | 3453 | 4233 | 784 |
| 4 | Network | 2345 | 2352 | 234 | 823 |
| 5 | Processor | 2342 | 3533 | 23423 | 342 |
| 6 | Cryptography | 323 | 5424 | 23342 | 0 |

Resource Table

| Resource ID | Resource Type | Active/Backup | Dependency Mask | Capacity Score | Reliability Contribution | Pool Assignment |
|---|---|---|---|---|---|---|
| 1 | Processor | Active | $67DEC5EA | 3453 | 0 | 3 |
| 2 | Processor | Backup 2 | $AB42EF11 | 4521 | 23 | 3 |
| 3 | Processor | Backup 1 | $2562F143 | 43 | 523 | 3 |
| 4 | Storage | Active | $BB2322ED | 15456 | 0 | 2 |
| 5 | Storage | Backup 1 | $94715492 | 734 | 453 | 2 |
| 6 | Storage | Backup 2 | $01ED00E2 | 3235 | 2542 | 2 |

FIG. 7

RESOURCE MANAGER

CROSS REFERENCE TO RELATED APPLICATIONS

This application incorporates by reference for all purposes the full disclosure of co-pending U.S. patent application Ser. No. 15/275,296, filed Sep. 23, 2016, entitled "JOURNAL SERVICE WITH NAMED CLIENTS," co-pending U.S. patent application Ser. No. 15/275,300, filed Sep. 23, 2016, entitled "MANAGEMENT OF ALTERNATIVE RESOURCES," and co-pending U.S. patent application Ser. No. 15/275,307, filed Sep. 23, 2016, entitled "MANAGEMENT OF A DATA PROCESSING PIPELINE."

BACKGROUND

Computing systems are assembled using a collection of resources such as memory resources, storage resources, processing resources, and networking resources. In some examples, when faced with a particular task, an operating system assigns a combination of resources to the task, so that the task can be performed. If a required resource is unavailable, performance of the task may fail. To avoid this problem, some computer systems arrange resources into a resource pool. The resource pool provides a number of backup resources should an assigned resource fail. In some examples, two matching computer servers are provided in a resource pool to perform a particular task. A first computer server operates as the primary resource, and a second computer server acts as a backup resource if the first computer server fails. In many examples, increasing the number of alternative resources in a resource pool improves the reliability of the computing system. However, the degree to which reliability is improved by pooling resources may be uncertain. For example, three computer servers connected to the same power source may fail simultaneously if the power source fails. For this reason, selecting an appropriate combination of resources to allocate to a resource pool is an important problem.

BRIEF DESCRIPTION OF THE DRAWINGS

Various techniques will be described with reference to the drawings, in which:

FIG. 6 shows an illustrative example of a database structure for maintaining application resource requirements and related resource pool information;

FIG. 7 shows an illustrative example of a database structure for maintaining resource information and resource pool information;

DETAILED DESCRIPTION

Figure 1:
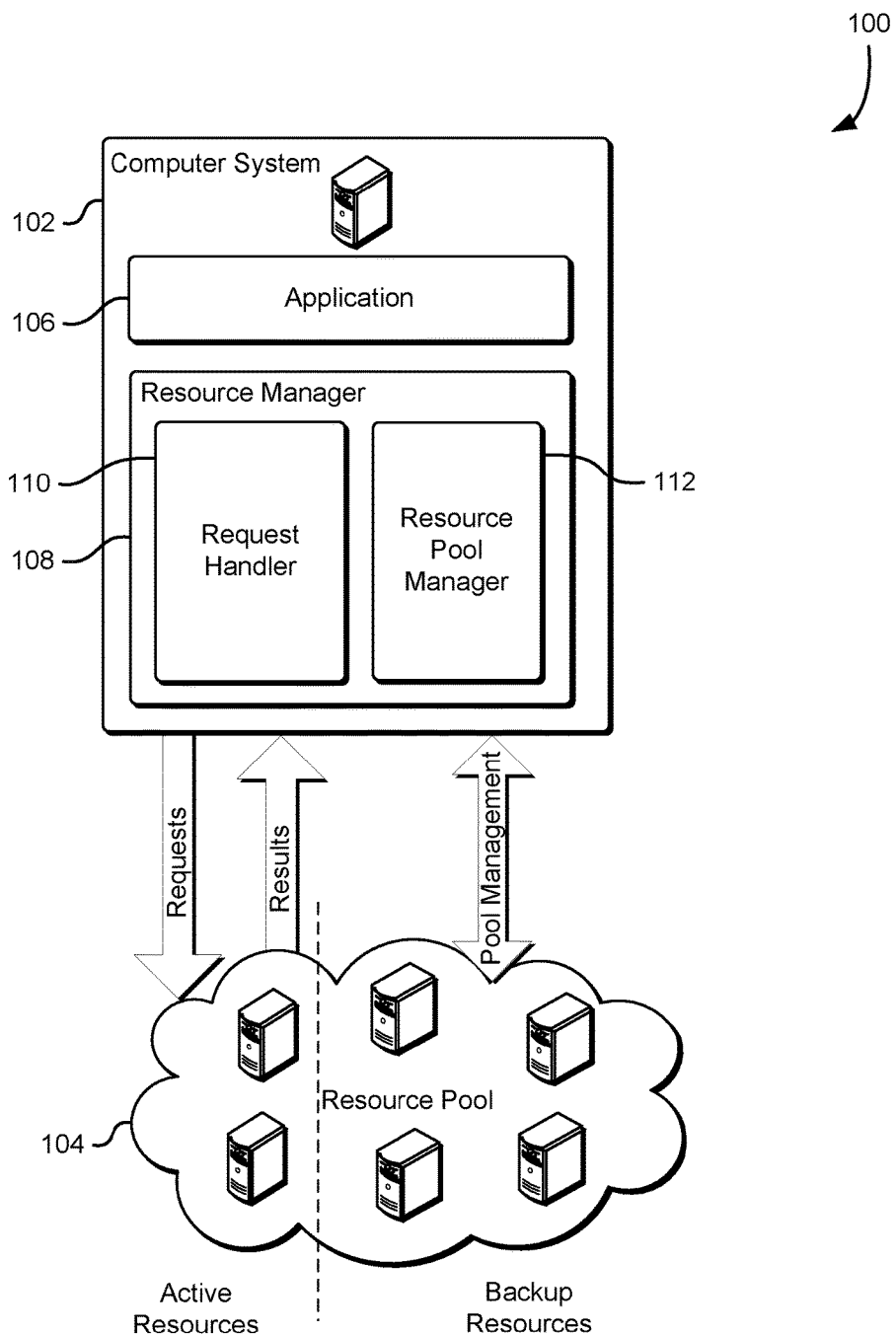
FIG. 1 shows an illustrative example of an environment in which various embodiments may be practiced.

The current document describes a resource manager that improves the reliability of a computing system by managing resources that are used to fulfill application requests. An application submits a set of resource requirements, and a reliability requirement, to a resource manager. In various examples, the resource requirements specify an amount of processing power, an amount of memory, an amount of available storage space, an amount of available network bandwidth, or other resource-capacity metric. The reliability requirement specifies a minimum reliability score expected by the application. The resource manager allocates a collection of resources into a resource pool having resources sufficient to meet the resource requirements provided by the application. A reliability score is determined for the pool of resources, and if the reliability score is less than the reliability requirement requested by the application, backup resources are added to the pool of resources. Using the reliability score, the resource manager is able to determine a reliability contribution attributable to each resource in the resource pool. Using this information, the resource manager may adjust the resources in the resource pool to reduce cost, improve performance, or further improve reliability.

In some examples, the resource manager is a service that is hosted on a computer system shared with the application. In another example, the resource manager is a service hosted on a computer system apart from the application. The resource manager includes a request handler and a resource pool manager. The request handler receives requests from an application, and acquires resources for fulfilling the request by sending a request for resources to the resource pool manager. The resource pool manager retrieves active resources that are allocated to the application, and provides them to the request handler. The request handler dispatches the request to the identified active resources, and the active resources process the application's request. As a result of processing the application's request, results are produced, and the active resources return the results to the request handler. The request handler returns the results to the application.

The resource pool manager selects and provides resources to the request handler based on a set of resource requirements associated with the application. The resource requirements may be provided by the application or by an entity responsible for resource management. The resource requirements include capacity and reliability requirements for one or more resource types. For example, an application may require 500 MHz of processing capacity, 2 MB of RAM, 1 GB of storage, and 1 Mb per second of network bandwidth, delivered with a reliability score of at least 1000. For each type of resource required by the application, the resource pool manager generates a resource pool to hold assets of the given type, and associates the resource pool with the application. For each resource pool associated with the application, the resource pool manager assigns a collection of resources to the resource pool such that the corresponding capacity and reliability requirements of the application are satisfied. The particular resources assigned to each resource pool are identified based on a determined capacity of each resource, and a determined reliability of each resource pool as a whole. Sufficient resources in each resource pool are activated to fulfill the various capacity requirements of the application. To fulfill the reliability requirements of the application, backup resources may be added to each resource pool until the required level of reliability is reached.

The resource pool manager maintains information associated with each resource being managed. The information describes the type of each resource, the capacity of each resource, and the reliability of each resource. In some examples, the capacity of a particular resource may be provided by the particular resource in response to a query. In other examples, the resource pool manager may determine the capacity of a particular resource by submitting a task to the particular resource and measuring the resulting performance. In various examples, the reliability of each resource is determined by identifying various failure points of each resource, and applying a failure rate to each identified failure point. The identified failure points may be represented in a bit mask and combined with bit masks representing failure points of other resources in a resource pool to identify shared points of failure across multiple resources in the resource pool. For a particular application, the shared points of failure for the resource pools associated with the application may be indicative of the reliability of the application.

The resource pool manager is able to analyze the effect of adding or removing resources from a particular resource pool. In particular, the resource pool manager determines, for each resource in a resource pool, the contribution the resource makes to the overall reliability of the resource pool. If the resource pool manager determines that a particular resource contributes no increased reliability, and is not currently active, the particular resource may be removed from the resource pool and the associated computing resource is made available for other purposes. Using this information, the resource pool manager may adjust the resources allocated to various resource pools to reduce costs, improve performance, or increase reliability.

If an active resource managed by the resource pool manager experiences a failure, the resource manager will activate backup resources from the resource pool to replace the failed resource. The reliability score for the resource pool will be recalculated, and if the reliability score for the resource pool falls below a threshold value, the resource pool manager may allocate additional resources as backup resources and assign them to the resource pool. In some examples, if the vulnerability cannot be addressed by allocating additional resources, the resource pool manager will notify the administrator of the identified failure points for which no backup resource is available.

FIG. 1 shows an illustrative example of an environment in which various embodiments may be practiced. A diagram 100 shows a computer system 102 that interacts with a resource pool 104. The computer system 102 may be a personal computer system, a computer server, a virtual computer system, a virtual computing environment, a container runtime, server cluster, or other application-hosting environment. The computer system 102 hosts an application 106 and a resource manager 108. In various implementations, the application 106 can be an application program, a service, a plug-in, a driver, or a script. The resource manager 108 provides a request handler 110 and a resource pool manager 112. The request handler 110 receives requests from the application 106 via an application programming interface, and fulfills the requests using a set of resources identified by the resource pool manager 112. In some examples, the application 106 and the resource manager 108 are hosted on separate computer systems, and the resource manager 108 is implemented as a network service that is accessible to the application 106. The resources in the resource pool 104 may be resources within the computer system 102, resources within the host computer system that hosts the resource manager 108, or remote resources accessible via a computer network.

The resource pool manager 112 maintains a set of resource requirements for the application 106. The resource requirements include capacity requirements and reliability requirements. Based at least in part on the set of resource requirements, the resource pool manager allocates a set of resources to the resource pool 104 which is associated with the application. The set of resources may include active resources and backup resources. The resource pool manager 112 allocates active resources to the resource pool 104 based on a capacity requirement, and allocates backup resources to the resource pool 104 based on a reliability requirement. For example, for a particular application that has a 20 MB storage capacity requirement, the resource pool manager 112 allocates a number of active storage resources to a storage resource pool that have a total combined capacity of at least 20 MB. The resource pool manager 112 determines a reliability score for the storage resource pool, and compares it to a reliability requirement associated with the application 106. Additional backup resources are added to the storage resource pool by the resource pool manager 112 to increase the reliability of the storage resource pool so that the reliability score of the storage resource pool meets or exceeds the reliability requirement of the application 106.

In some examples, the resource pool manager 112 maintains an application-level resource pool that includes a number of subordinate resource pools for the application 106. The subordinate resource pools are maintained for different resource types. Resource types may include processing resources, storage resources, memory resources, networking resources, cryptography resources, or other computing resources. Each subordinate resource pool is configured by the resource pool manager 112 to satisfy a particular resource-type requirement of the application 106. Reliability of the application-level resource pool is determined based at least in part on the reliability of the related subordinate resource pools. Backup resources may be added to the subordinate resource pools to increase the reliability of the subordinate resource pools and also increase the reliability of the application-level resource pool so that an application-level resource reliability requirement is met.

The resource pool manager 112 monitors the performance and reliability of the resources allocated to resource pools managed by the resource pool manager 112. In response to changes in performance and reliability, resources may be added or removed from resource pools so that application requirements continue to be met or exceeded. In some examples, the resource pool manager 112 adjusts the resources allocated to a particular pool to reduce cost, or in response to an administrator-defined resource preference.

Figure 2:
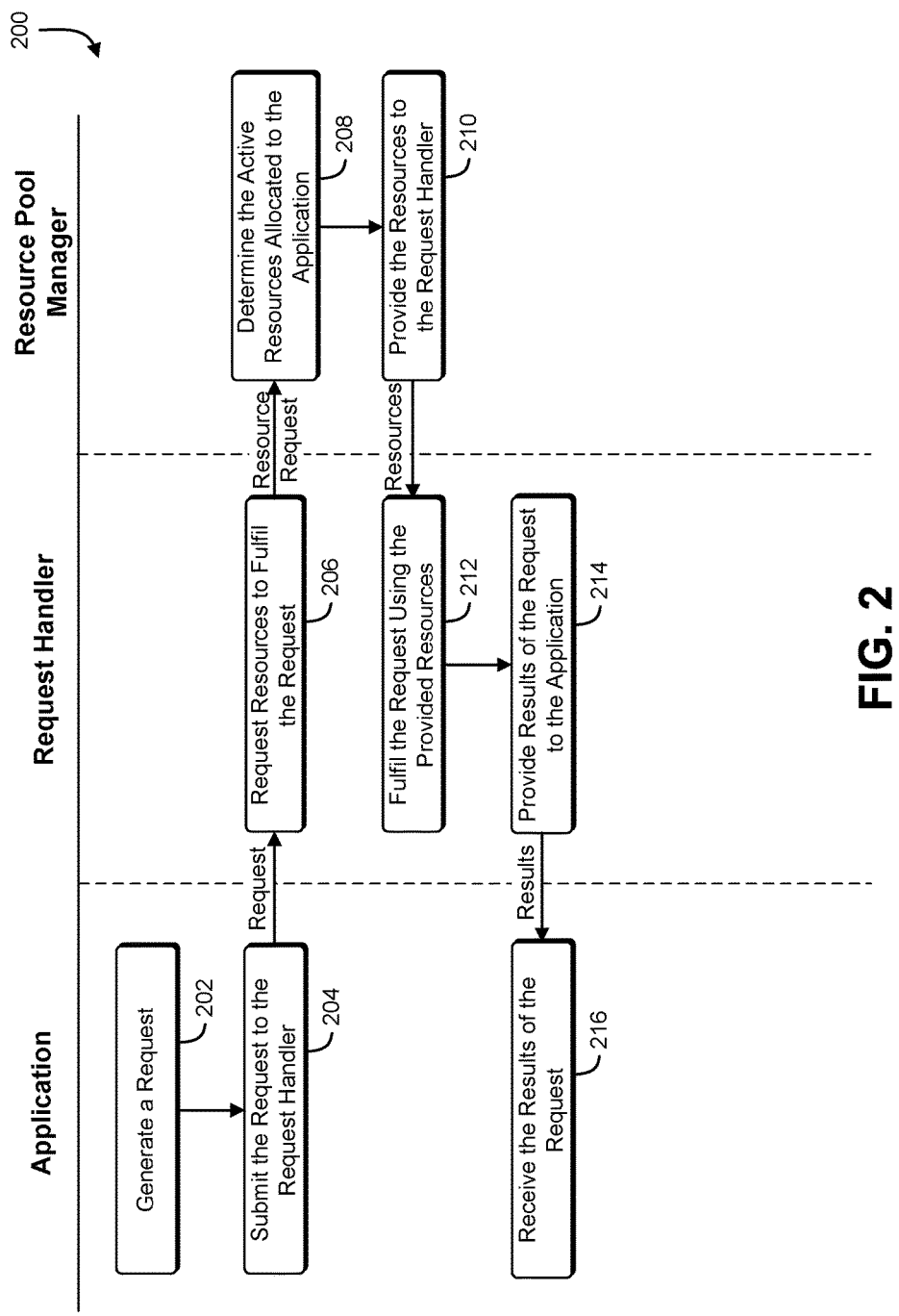
FIG. 2 shows an illustrative example of a process that, as a result of being performed by an application, a request handler, and a resource pool manager, fulfills a request submitted by the application using a resource provided by the resource pool manager.

FIG. 2 shows an illustrative example of a process that, as a result of being performed by an application, a request handler, and a resource pool manager, fulfills a request submitted by the application using the resource provided by the resource pool manager. A swim diagram 200 shows a process that begins at block 202 with an application generating a request. In various examples, the request is a processing request, a storage request, a cryptographic request, or a service request generated as a result of processing performed by an application. At block 204, the application submits the request to the request handler. The request handler receives the request, determines the identity of the application, and submits a resource request 206 that identifies the application to the resource pool manager. In some implementations, the resource request includes request-specific resource requirements. The request-specific resource requirements may limit the types of resources requested to a subset of the resource types allocated to the application.

At block 208, the resource pool manager receives the resource request. Based at least in part on the identity of the application provided in the resource request, the resource pool manager identifies one or more resource pools containing resources that are allocated to the application. The resource pool manager identifies the resources that are active within the identified resource pools, and provides 210 a set of resource identifiers or other access handles associated with the active resources to the request handler. In various examples, the resource identifiers are host names associated with computer systems, disk storage volume identifiers, URLs associated with online services, or memory address ranges.

At block 212, the request handler receives the resource identifiers from the resource pool manager. Using the resource identifiers, the request handler configures the application's request to use the resources associated with the provided resource identifiers. In some examples, the request is configured by submitting the request to a processing resource identified using the resource identifiers, and passing the remaining resource identifiers as parameters with the request. The request handler causes the application's request to be fulfilled using the resources associated with the identified resource identifiers, and acquires the results of the request. In various examples the results include data and/or a request status. At block 214, the request manager provides the results to the application, and at block 216, the application receives the results from the request handler.

Figure 3:
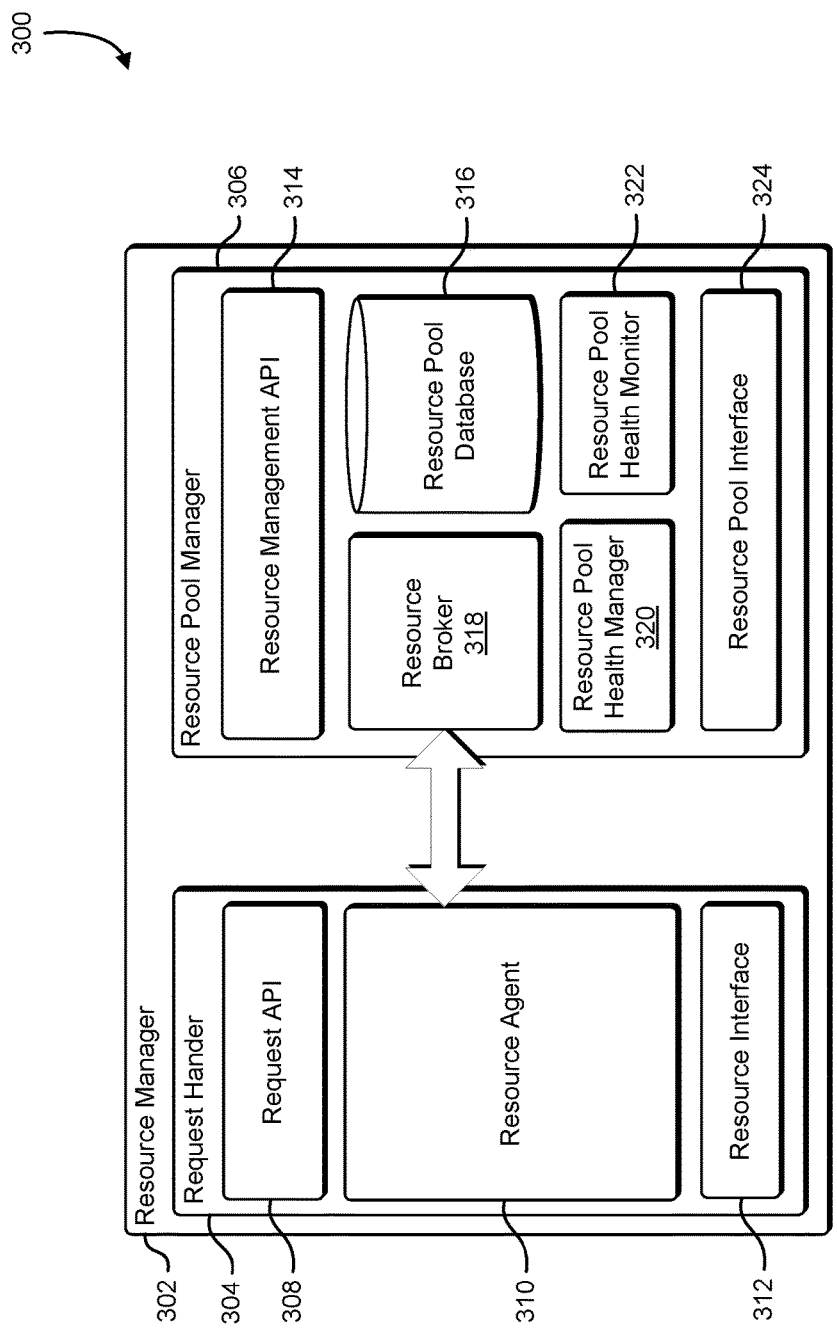
FIG. 3 shows an illustrative example of a resource manager that manages resources in one or more resource pools.

FIG. 3 shows an illustrative example of a resource manager that manages resources in one or more resource pools. A block diagram 300 illustrates a structure for a resource manager 302. The resource manager 302 includes a request handler 304 and a resource pool manager 306. The request handler 304 includes a request API 308, a resource agent 310, and a resource interface 312. The request API 308 is an interface that allows applications to submit requests to the resource manager 302. In various implementations, the request API 308 may be accessible to applications via an operating system call on a host computer system, a web-based service interface, or a remote procedure call. The resource agent 310 is a component of the request handler 304 that is responsible for acquiring resources from the resource pool manager 306. When a request arrives from the application is received by the request API 308, and the resource handler invokes the resource agent 310. The resource agent 310 contacts the resource pool manager 306 and requests resources to fulfill the request. The resource pool manager 306 responds by identifying active resources that are allocated to the application, and provides the request handler 304 with a set of resources sufficient to fulfill the request. The resource interface 312 uses the resources provided by the resource pool manager 306 to fulfill the application request. In some examples, the resources provided by the resource pool manager 306 include a processing resource, and the resource interface 312 causes the processing resource to perform operations that fulfill the application request. Results produced as a consequence of fulfilling the request are returned to the request handler 304, which in turn provides the results to the application.

The resource pool manager 306 includes a resource management API 314, a resource pool database 316, a resource broker 318, a resource pool health manager 320, a resource pool health monitoring 322, and a resource pool interface 324. The resource management API 314 is an application programming interface that allows an application, or other resource-management entity to interact with the resource pool manager 306. Application resource requirements may be supplied to the resource pool manager 306 via the resource management API 314. The resource management API 314 may be accessed via a local call on the host computer system, or via a network-based service interface. The resource pool database 316 is a database that holds capacity and reliability requirements for the applications, resource pool definitions and assignments, and information describing the resources managed by the resource pool manager 306. The resource broker 318 is a component of the resource pool manager 306. The resource broker 318 receives and fulfills corporate resource requests received by the resource agent 310. When a resource request is received from the resource agent 310, the resource broker 318 queries the resource pool database to identify active resources that are assigned to the application, and provides the identified resources to the resource agent 310.

The resource pool health manager 320 and the resource pool health monitor 322 work together to monitor and update the resource pools so that the resource pool manager 306 continues to satisfy the capacity and reliability requirements of the client applications. The resource pool health monitor 322 evaluates a resource pool, and determines a capacity score and a reliability score for the resource pool. The capacities score and the reliability score may be updated by the resource pool health monitor in response to changes to the resource pool, or on a periodic basis. The capacity score represents an amount of processing, storage, data transmission, or transactions that a particular resource or resource pool is able to perform. For example, a processing resource may have a capacity score represented in operations per second, and a storage resource may have a capacity score represented in megabytes of free storage space. For the resource pool, the capacity score is equal to the sum of the capacities of the active resources assigned to the resource pool. The reliability score is a comparable value that represents a predicted probability that a resource will fail. The reliability score of a resource pool is based on the reliability scores of each of the resources within the resource pool.

In a particular implementation, the reliability of a particular resource is determined by identifying a set of dependencies, and associating a chance of failure with each dependency. The set of dependencies is represented using a reliability bit mask. A reliability score for a resource pool is determined by combining the reliability bit masks of the active resources in the resource pool with a logical OR operation to produce an active dependency mask. The active dependency mask is combined with the reliability bit masks of the backup resources using a logical AND operation. The reliability score for the resource pool is determined using the resulting bit mask. The resulting bit mask represents the set of dependencies that may cause a failure of the resource pool. In one example, the reliability score for the resource pool is determined by adding, for each bit set in the resulting bit mask, the probability that the corresponding dependency will fail.

The resource pool health manager 320 makes adjustments to the resource pools managed by the resource pool manager 306 based on information provided by the resource pool health monitor 322. The resource pool health manager 320 compares the capacity and reliability scores provided by the resource pool health monitor 322 and compares them to corresponding capacity and reliability requirements retained in the resource pool database 316. In some examples, the resource pool health manager 320 determines that the reliability of a particular resource pool does not meet a corresponding reliability requirement, and allocates additional backup resources to the particular resource pool to increase the reliability of the resource pool until the corresponding reliability requirement is met. In another example, the resource pool health manager 320 determines that the reliability contribution associated with a particular backup resource is below a threshold value, or zero, and removes the particular backup resource from the resource pool.

The resource pool interface 324 provides an interface between the resource manager 302 and resources that are assigned to resource pools. The resource pool interface 324 provides the resource manager 302 with the ability to query the status of particular resources, and measure the performance of particular resources. The resource pool interface 324 provides a mechanism that identifies additional resources that the resource manager 302 can add to resource pools. In some examples, the additional resources may be identified by broadcasting a query packet over a computer network, causing the additional resources to identify themselves to the resource pool interface 324. In other examples, the resource pool interface 324 queries a resource database that maintains information describing the additional resources. In yet another example, the resource pool interface 324 acquires additional resources by requesting the additional resources from a service provider.

Figure 4:
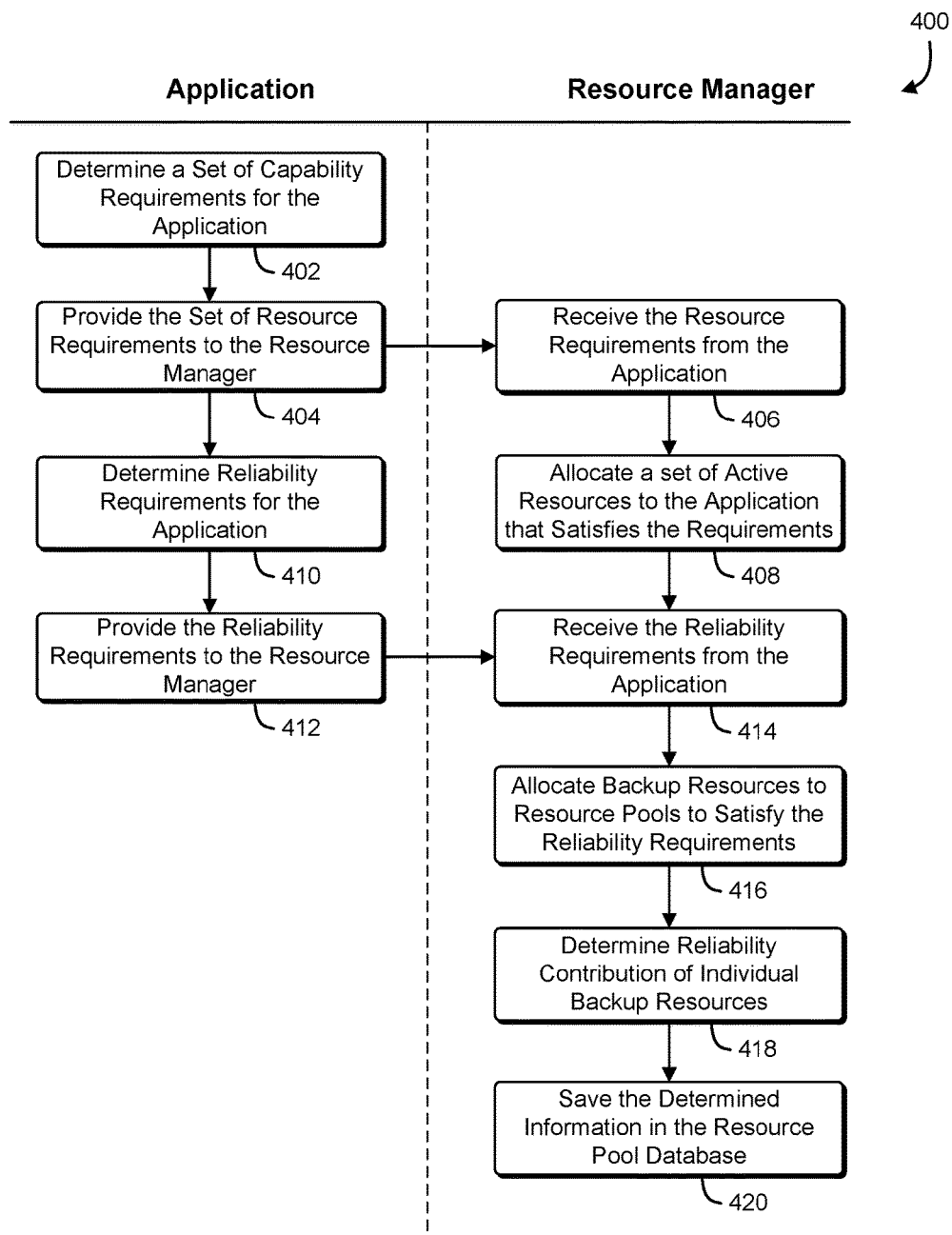
FIG. 4 shows an illustrative example of a process that, as a result of being performed by an application and a resource manager, allocates resources to one or more resource pools for use in fulfilling application requests.

FIG. 4 shows an illustrative example of a process that, as a result of being performed by an application and a resource manager, allocates resources to one or more resource pools for use in fulfilling application requests. A swim diagram 400 illustrates a process that begins at block 402 with an application determining a set of resource capacity requirements for the application. The set of capacity requirements may include capacity requirements for various resource types such as processing, storage, memory, network bandwidth, or other resource types. At block 404, the application provides the set of resource requirements to the resource manager.

The resource manager receives 406 the capacity requirements from the application, and stores the capacity requirements in a resource pool database in association with the identity of the application. At block 408, for each type of resource for which a capacity requirement was provided, the resource manager identifies a set of available resources of the type. The resource manager selects, from the set of available resources, a set of active resources that in total, meet the associated capacity requirement. In some examples, the resource manager measures the capacity of each resource in the set of available resources, and selects the minimum number of resources required to meet the associated capacity requirement by selecting the resources having the greatest associated capacity. The resource manager generates a resource pool for the resource type, associates the resource pool with the application, and adds the selected resources to the resource pool.

At block 410, after the application has provided the set of resource requirements to the resource manager, the application determines reliability requirements for the application. The reliability requirements for the application may be provided by a user, an administrator, or may be defined by the application itself. The reliability requirement is communicated in the form of a reliability score. In some examples, the reliability requirement is a single reliability score for the application. In another example, the reliability requirement is a set of reliability requirements where each reliability requirement in the set of reliability requirements is associated with a different resource type. At block 412, the application provides the reliability requirements to the resource manager.

The resource manager receives 414 the reliability requirements from the application, and stores the reliability requirements in a resource pool database in association with the identity of the application. At block 416, the resource manager determines a dependency mask for each resource available to the resource manager. The dependency mask of each resource identifies a collection of dependencies on which the particular resource relies to remain operational. For example, if a particular resource depends on a first host, a second storage device, and a third online service, bits in the dependency mask that correspond to the first host, the second storage device, and the third online service will be set, and the remaining bits will be cleared. In some implementations, the resource manager is also provided with information that identifies a failure rate for each dependency represented in the dependency mask. In other implementations, the resource manager assumes a constant failure rate for each dependency in the dependency mask.

The resource manager determines a reliability score for each resource pool associated with the application by combining the dependency masks associated with the active resources of each pool with a logical OR operation to produce an active resource dependency mask for each resource pool. The final dependency mask for each resource pool is determined by combining the active resource dependency mask with a dependency mask associated with each backup resource using a logical AND operation. The set bits in the resulting dependency mask represent dependencies that may fail and prevent the resource manager from providing adequate resources to the application.

In some implementations, the dependency masks of each pool assigned to a particular application are combined with a logical OR operation to produce an application dependency mask. The application dependency mask may be used to generate a reliability score that represents the probability that a dependency will fail, preventing the application from acquiring sufficient resources from the resource manager.

For each resource pool associated with the application, the resource manager adds backup resources to the resource pool until the determined reliability score of the resource pool meets or exceeds a corresponding reliability requirement provided by the application. If an application reliability requirement is provided, and the resulting application reliability score fails to meet the application reliability requirement, the resource manager adds resources to those resource pools that are associated with the application, and are associated with the worst resource pool reliability scores. In some examples, the resource manager adds resources to those resource pools that have the largest number of dependencies of the resource pools associated with the application.

At block 418, the resource manager performs an analysis of the individual resources and determines a reliability contribution for each individual resource. The reliability contribution is determined by re-evaluating the reliability score of the application, without processing the dependency mask associated with the individual resource. In some examples, if an individual resource is determined to have no contribution to reliability, and is also a backup resource, the individual resource is removed from the resource pool. In another example, if an individual resource is determined to have a reliability contribution below a threshold value, the individual resource is removed from the resource pool. In yet another example, the resource manager examines additional available resources, and determines their potential reliability contribution. If the potential reliability contribution of an additional resource exceeds that of a resource already allocated to the resource pool, the available resource replaces the resource already allocated to the resource pool. At block 420, the resource manager saves the determined reliability and capacity information in the resource pool database.

Figure 5:
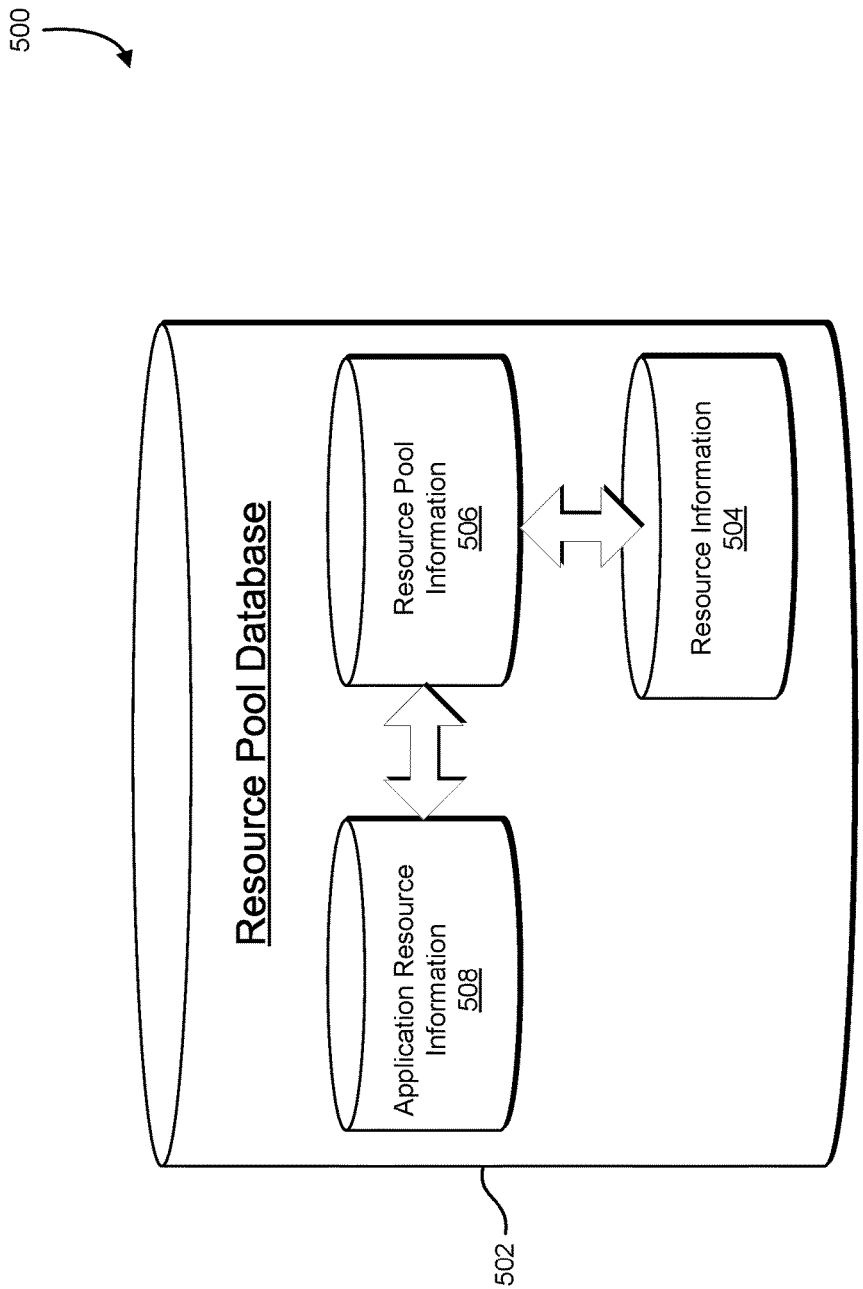
FIG. 5 shows an illustrative example of a resource pool database maintained by the resource manager.

FIG. 5 shows an illustrative example of a resource pool database maintained by a resource manager. A diagram 500 shows a resource pool database 502. The resource pool database 502 holds resource information 504, resource pool information 506, and application resource information 508. The resource information 504 includes information associated with individual resources managed by the resource manager. For each individual resource in the resource information 504, the resource information 504 identifies a resource type for the individual resource, a determined capacity for the individual resource, and information describing the reliability of the individual resource. For each resource pool managed by the resource manager, the resource pool information 506 identifies the resource types in the resource pool, a capacity of the resource pool, a reliability of the pool, a capacity requirement for the pool and a reliability requirement for the pool. Each individual resource represented in the resource information 504 may be linked to a resource pool represented in the resource pool information 506. If a resource is linked to a resource pool, information in the resource information 504 indicates whether the resource is an active resource for a backup resource. The application resource information 508 contains information that individual applications with one or more resource pools described in the resource pool information 506. The application resource information 508 retains application capacity and reliability requirements. Application records in the application resource information 508 are linked to one or more resource pool records in the resource pool information 506. Each resource pool record in the resource pool information 506 may be linked to one or more resource records in the resource information 504.

The resource pool database 502 may be implemented as a collection of linked tables within a database, or as a number of separate linked databases. In some implementations, the resource pool database is a database maintained within the resource manager. In other implementations, the resource pool database is implemented using a remote database that is accessible by the resource manager.

FIG. 6 shows an illustrative example of a database structure for maintaining application resource requirements and related resource pool information. A data diagram 600 shows an application resource table containing application resource information and a resource pool table for containing resource pool information. The application resource table includes an application name field 602, a capacity requirement field 604, a reliability requirement field 606, and a resource pools field 608. The application name field 602 identifies the name of the application associated with a particular record. The capacity requirement field 604 holds a capacity requirement that is associated with the application. The capacity requirement may be specified using; an aggregate capacity score determined by the resource manager, a capacity score for each resource pool associated with an application, or a capacity requirement for each resource pool specified in units that are based on the resource type associated with the resource pool. The reliability requirement field 606 specifies an application reliability score required by the application. The resource pools field 608 identifies one or more resource pools containing resources that are allocated to the application.

The schema of the resource pool table includes a resource pool ID field 610, a resource type field 612, a pool reliability field 614, an active capacity field 616, a capacity requirement field 618, and a reliability requirement field 620. The resource pool ID field 610 holds an identifier that identifies a resource pool. The resource pools field 608 of the application resource table links to the resource pools in the resource pool table using the identifiers in the resource pool ID field 610. The resource type field 612 specifies the type of resource that may be placed in the resource pool. The pool reliability field 614 holds the resource pool reliability score determined by the resource manager. The active capacity field 616 holds the capacity of the resource pool determined by the resource manager. The capacity requirement field 618, holds a capacity requirement associated with the resource pool, and the reliability requirement field 620 holds a reliability requirement associated with the resource pool.

In the example shown in FIG. 6, an application record 622 in the application resource table is associated with an application named 'Monitor.' The application has been assigned three resource pools identified by a list of resource pool identifiers 1, 2, and 3. The application has a reliability requirement of 43, and specifies a capacity requirement for the three associated resource pools (1, 2, and 3) of 3452, 2342, and 4233 respectively. Information associated with the resource pools is contained in the resource pool table, and is held in a first resource pool record 624, a second resource pool record 626, and a third resource pool record 628. The first resource pool record 624 holds information associated with resource pool 1. Resource pool 1 holds resources of type 'memory,' has a determined reliability of 523, and an active capacity of 5626. The first resource pool record 624 has a capacity requirement of 3452 and a reliability requirement of 212. The second resource pool record 626 holds information associated with resource pool 2. Resource pool 2 holds resources of type 'storage,' has a determined reliability of 2995, and an active capacity of 15456. The second resource pool record 626 is a capacity requirement of 2342 and a reliability requirement of 1233. The third resource pool record 628 holds information associated with resource pool 3. Resource pool 3 holds resources of type 'processor,' has a determined reliability of 546, an active capacity of 3453, a capacity requirement of 4233, and a reliability requirement of 784.

FIG. 7 shows an illustrative example of a database structure for maintaining resource information and resource pool information. A data diagram 700 illustrates a structure for a resource pool table and a resource table. The resource pool table includes a resource pool ID field 702, a resource type field 704, a pool reliability field 706, an active capacity field 708, a capacity requirement field 710, and a reliability requirement field 712. The fields of the pool resource table hold information as described above in the description associated with FIG. 6. The resource table includes a resource ID field 714, a resource type field 716, an active/backup field 718, a dependency mask field 720, a capacity score field 722, and a reliability contribution field 724. A pool assignment field 726 links individual resource table records to associated resource pool in the resource pool table. The pool assignment field 726 contains a value that matches a value in the resource pool ID field 702 of the resource pool table to indicate a link between the matching records.

The resource ID field 714 holds an identifier used to identify an individual resource. The resource type field 716 identifies the type of the resource. The active/backup field 718 that indicates whether a particular resource is active or is a backup resource. In some implementations, an active/backup field 718 indicates a backup order for the resources in a particular resource pool. The means for defining the order of backup resources may be a comparable value stored in association with the resource state such as an integer appended to the resource state value. In some examples, the comparable value is a capability score or a reliability score associated with the backup resource. In another example, the comparable value is a cost measure associated with the backup resource. The dependency mask field 720 holds information that is indicative of the reliability of the resource, and identifies dependencies associated with the particular resource. The capacity score field 722 holds a capacity indicator associated with the resource. The reliability contribution field 724 holds a value determined by the resource manager which indicates a contribution made by the particular resource to the overall reliability of the resource pool. In some implementations, the reliability contribution field 724 represents the reliability contribution to the overall application reliability.

The example in FIG. 7 shows a first resource pool record 728 and a second resource pool record 730. The first resource pool record 728 is a resource pool containing storage resources. The current pool reliability of the first resource pool is 2995, and the capacity of the resource pool is 15456. The first resource pool has a capacity requirement of 2342 and a reliability requirement of 1233. The second resource pool record 730 is a resource pool containing processor resources. The current pool reliability of the second resource pool is 1546 and the active capacity is 3453. The second resource pool has a capacity requirement of 4233 and a reliability requirement of 784. A first resource record 734, a second resource record 736, and a third resource record 738 are linked to the first resource pool record 728. A fourth resource record 740, a fifth resource record 742, and a sixth resource record 744 are linked to the second resource pool record 730.

Figure 8:
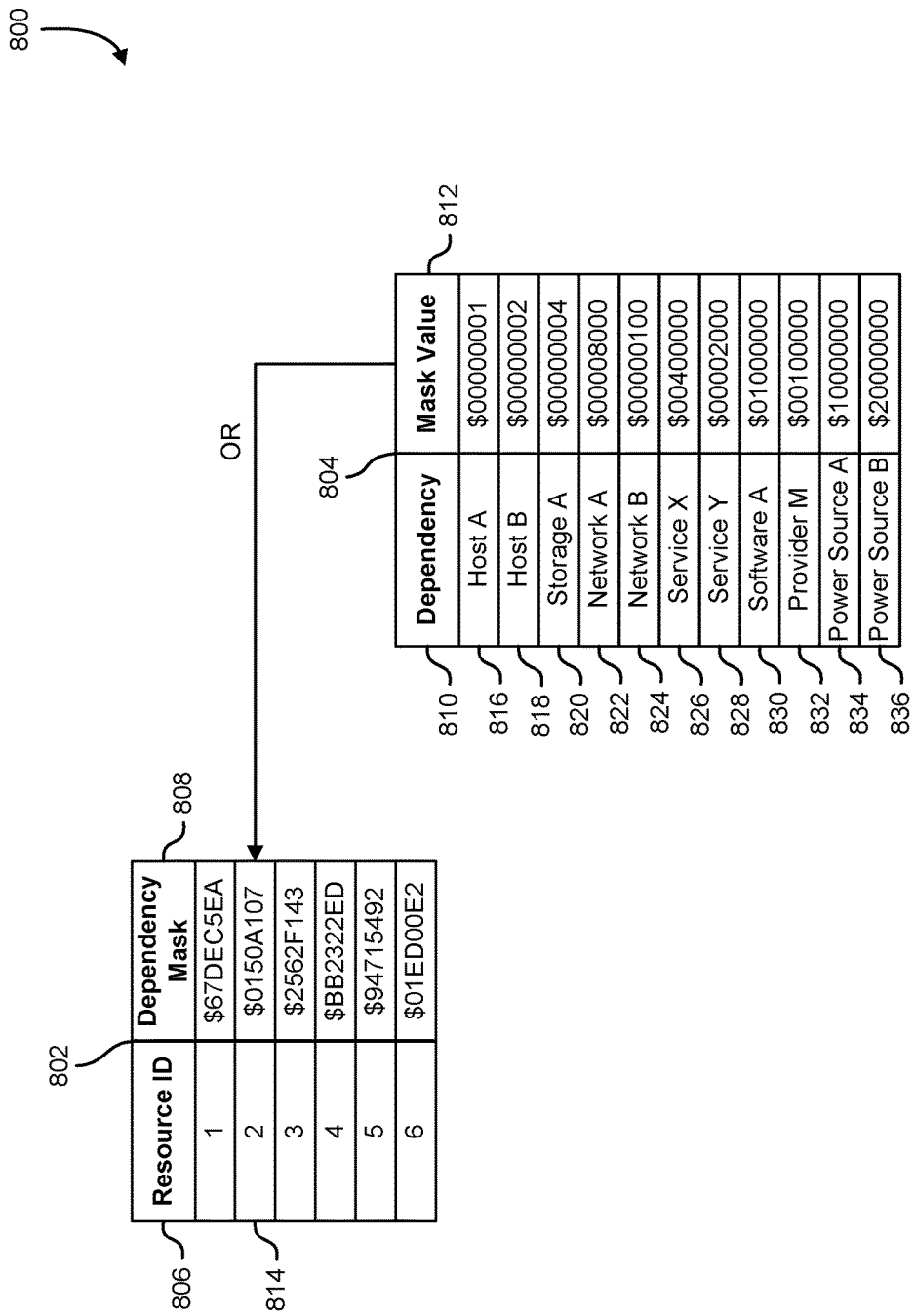
FIG. 8 shows an illustrative example of a dependency mask that records dependencies associated with individual resources.

FIG. 8 shows an illustrative example of a dependency mask that records dependencies associated with individual resources. A data diagram 800 illustrates how a dependency mask in a resource table 802 may be generated from a dependency table 804. The resource table 802 includes a resource ID field 806 and a dependency mask field 808. The dependency table includes a dependency field 810 and a mask value field 812. The particular resource record 814 links a resource ID with a dependency mask value. The dependency mask value is generated by identifying, from the dependency table 804, particular dependencies of the resource associated with the resource ID of the particular resource record 814.

The resource manager analyzes the particular resource and identifies one or more applicable dependencies from the dependency table 804. Each row of the dependency table 804 identifies a dependency and an associated single-bit mask value. The resource manager extracts the mask values associated with the applicable dependencies, and combines the mask values with a logical OR operation to produce the dependency mask value in the resource table 802.

The dependency table 804 includes a number of example dependencies. Each dependency identifies a potential point of failure that may be associated with a resource. A first host dependency 816 and a second host dependency 818 may be used to indicate that a particular resource is hosted by host A or host B respectively. A storage dependency 820 indicates that the operation of a particular resource is dependent on the availability of storage resource A. A first network dependency 822 and a second network dependency 824 may be used to indicate that the operation of a particular resource relies on access to network A or network B. A first service dependency 826 and a second service dependency 828 may be used indicate that the operation of a particular resource is dependent on access to service X or service Y. In various implementations, a service dependency may be a dependency on a web service, and authentication service, a cryptographic service, or key management service. A software dependency 830 may be used to indicate that the implementation of a particular resource is dependent on access to a software library, or that the implementation of the particular resource is dependent on a particular version of a software library. A provider dependency 832 may be used indicate that the operation of a particular resource is dependent on a service provider. The service provider may be an online service provider, a business service provider, or government service provider. A first power supply dependency 834 and a second power supply dependency 836 used indicate that the operation of a particular resource is dependent on electrical power supplied by the first power supply or the second power supply respectively.

Figure 9:
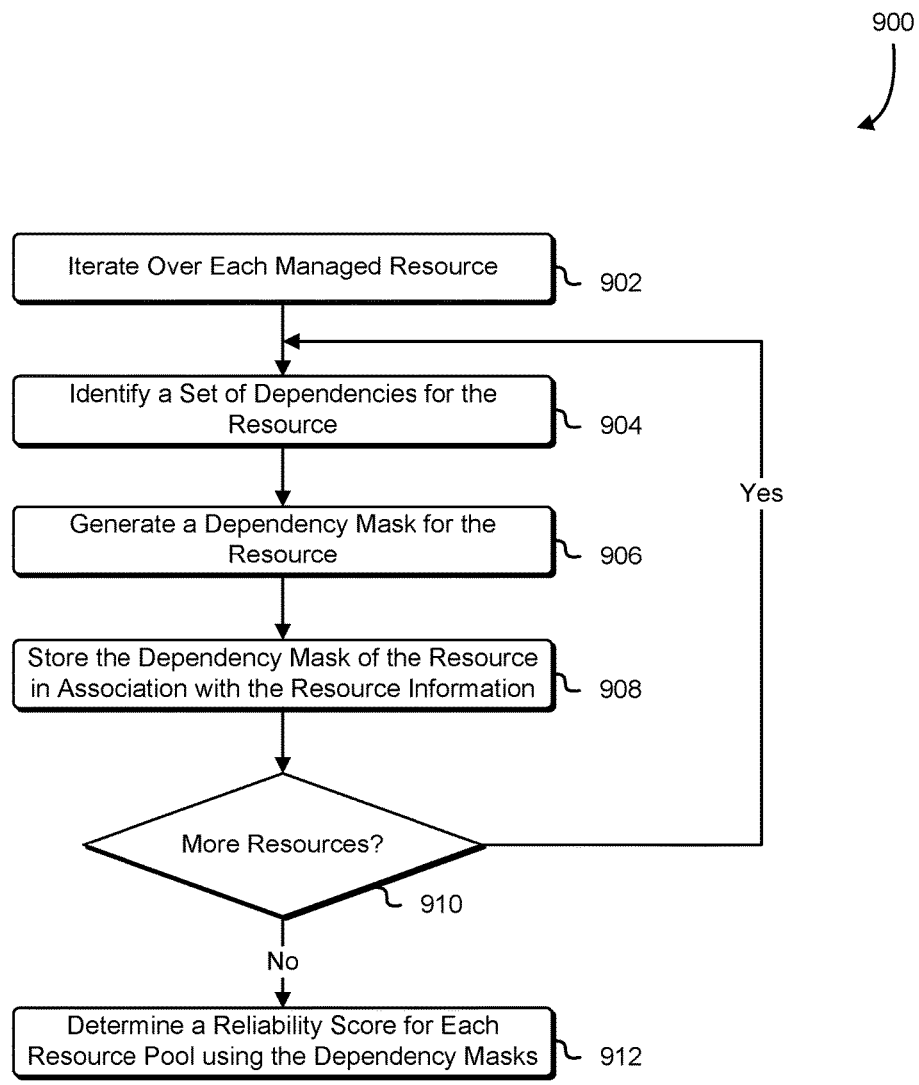
FIG. 9 shows an illustrative example of a process that, as a result of being performed by a resource manager, determines a dependency mask for a set of resource managed by the resource manager.

FIG. 9 shows an illustrative example of a process that, as a result of being performed by a resource manager, determines a dependency mask for a set of resources managed by the resource manager. A flowchart 900 illustrates a process that begins at block 902 with a resource manager initiating a loop that iterates over a collection of resource records that contain information associated with resources managed by the resource manager. For each resource associated with a resource record, the resource manager identifies 904 a set of dependencies associated with the resource. The dependencies may include network segments, host computer systems, online services, storage services, storage devices, or other computing resources that the resource relies on. The resource manager generates 906 a dependency mask based at least in part on the set of dependencies associated with the resource. In some implementations, the dependency mask is a sequence of binary bits where each bit in the sequence represents a different dependency, and the presence of a particular dependency is indicated by the corresponding bit having a value of one, and the absence of a particular dependency is indicated by the corresponding bit having a value of zero. At block 908, the resource manager stores the generated dependency mask to the resource record. At decision block 910, if there are more resource records to process, execution returns to block 904 where dependencies associated with the next resource record are identified. If there are no more resource records to process, execution advances to block 912 and the resource manager uses the dependency masks of the individual resources to determine a reliability score for each resource pool managed by the resource manager. In some examples, the reliability score for each resource pool is determined as shown in FIG. 10.

Figure 10:
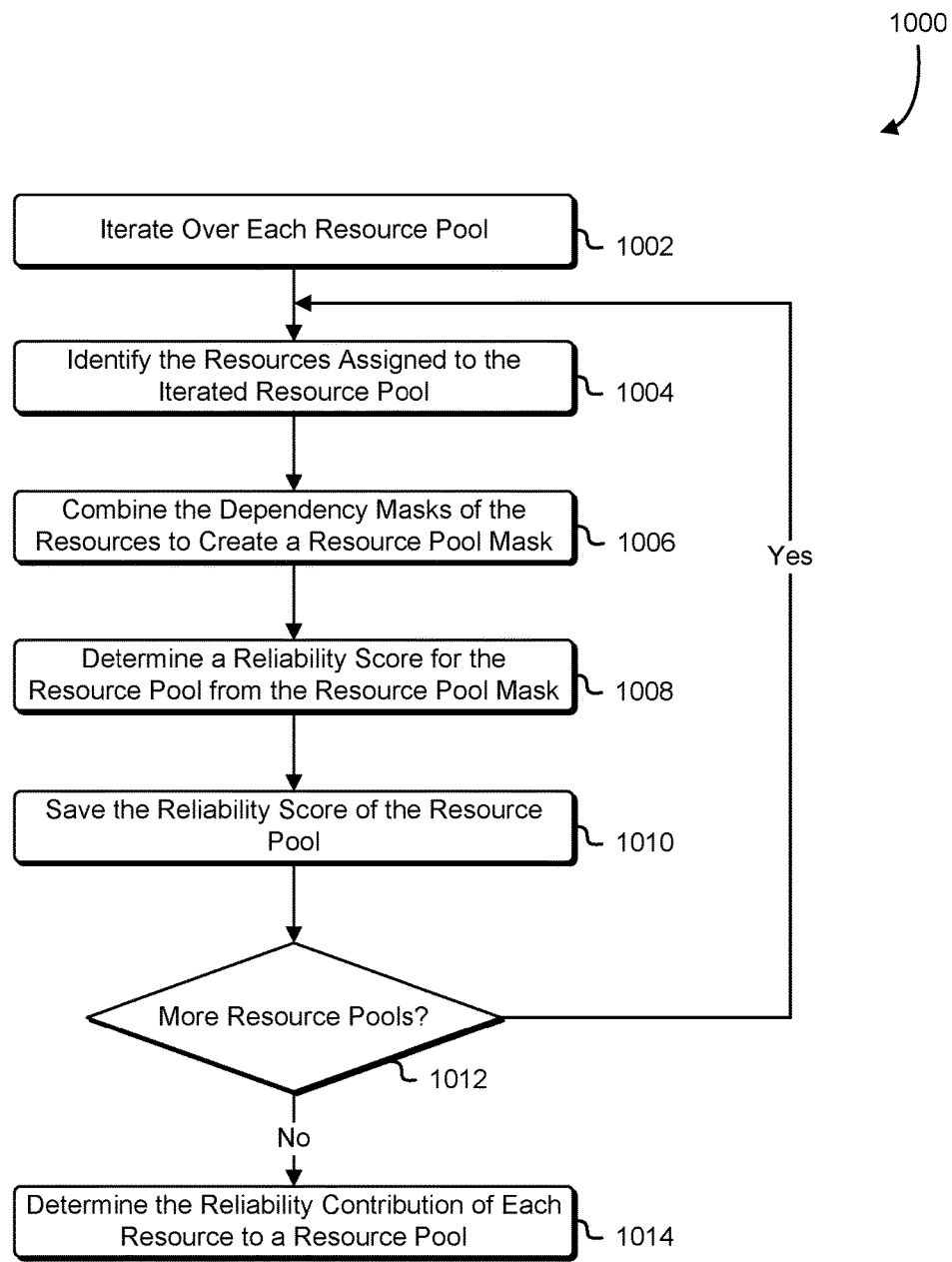
FIG. 10 shows an illustrative example of a process that, as a result of being performed by a resource manager, determines a reliability score for a resource pool based on a number of dependency masks associated with resources in the resource pool.

FIG. 10 shows an illustrative example of a process that, as a result of being performed by a resource manager, determines a reliability score for a resource pool based on a number of dependency masks associated with resources in the resource pool. A flowchart 1000 illustrates a process that begins at block 1002 with a resource manager initiating a loop that iterates over a collection of resource pool records associated with resource pools managed by the resource manager.

For each resource pool associated with a resource pool record, the resource manager identifies 1004 a collection of resource records that are assigned to the resource pool. At block 1006, the resource manager combines the dependency masks associated with the collection of resource records into a dependency mask for the resource pool. The dependency mask for the resource pool is created by taking the dependency masks of the active resources, and combining them with a logical OR operation to identify dependencies on which the active resources rely. The resulting mask is combined with the dependency masks associated with backup resources in the resource pool is a logical AND operation. The resulting dependency mask may be used to identify the presence of dependencies which, if they fail, have the potential to prevent the resource manager from providing adequate resources to an application. At block 1008, the resource manager determines a reliability score for the resource pool based at least in part on the dependency mask of the resource pool determined in block 1006. In some examples, a probability of failure is associated with each dependency in the dependency mask, and the probabilities of failure are combined to determine a probability of any failure. In another example, the number of dependencies in the dependency mask are added, and the total number of dependencies are used to generate the reliability score for the resource pool. At block 1010, the resource manager saves the determined reliability score of the resource pool in the resource pool record.

At decision block 1012, the resource manager determines whether more resource pool records remain to be processed. If there are more resource pool records to process, execution returns to block 1004 and the resources assigned to the next resource pool are identified. If there are no more resource pool records to process, execution proceeds to block 1014 and the resource manager determines a reliability contribution associated with each resource assigned to a resource pool. A process for determining a reliability contribution may be implemented in accordance with the process illustrated in FIG. 11.

Figure 11:
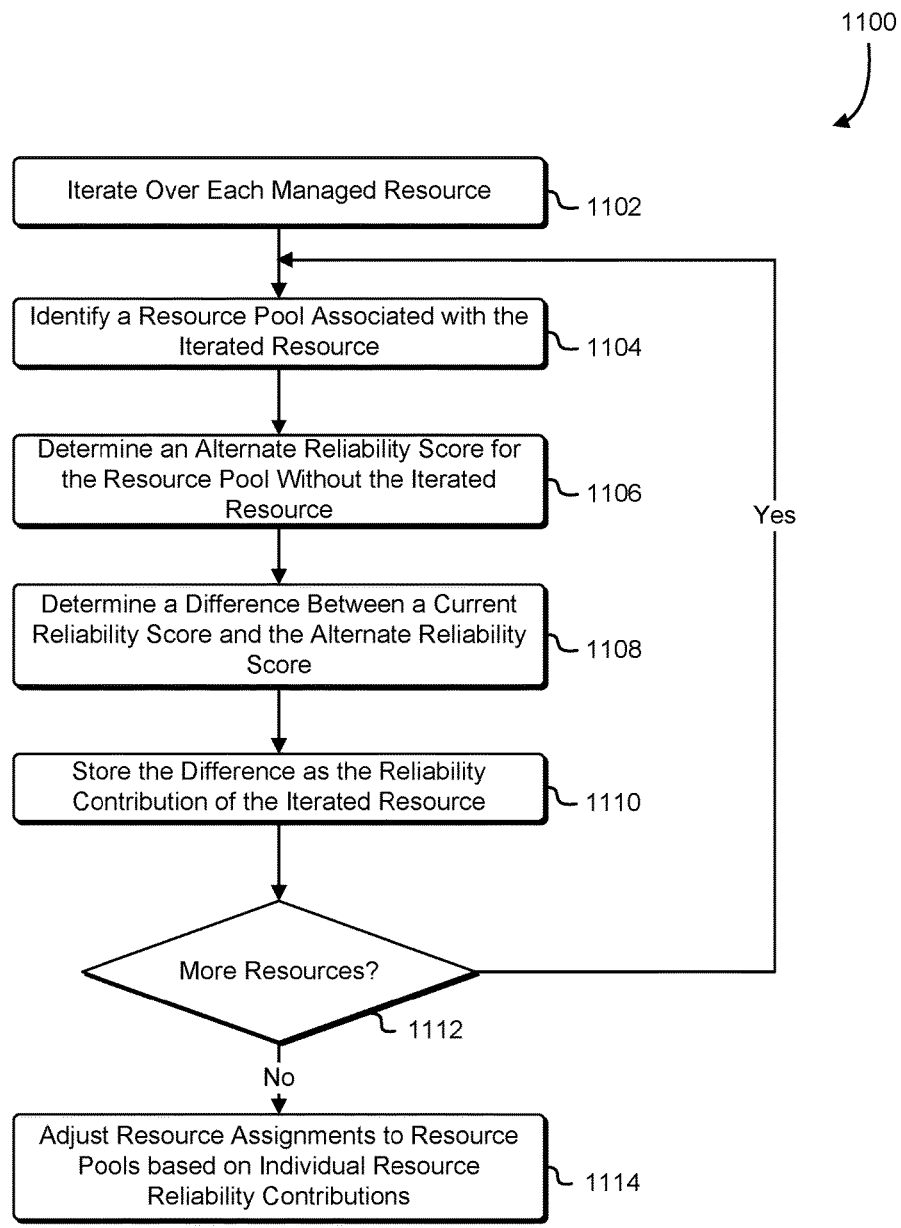
FIG. 11 shows an illustrative example of a process that, as a result of being performed by a resource manager, determines a reliability contribution associated with a particular resource in a resource pool.

FIG. 11 shows an illustrative example of a process that, as a result of being performed by a resource manager, determines a reliability contribution associated with a particular resource in a resource pool. A flowchart 1100 illustrates a process that begins at block 1102 with a resource manager iterating over a set of resource records associated with resources managed by the resource manager.

For each resource record, the resource manager determines whether the resource record is associated with a resource pool, and identifies 1104 the resource pool with which the resource record is associated. At block 1106, the resource manager recalculates a reliability score for the resource pool as described elsewhere in the present application, but excludes the resource associated with the current resource record from the recalculation. The resource manager determines 1108 a difference between the recalculated reliability score and the current reliability score of the identified resource pool. At block 1110, the difference is stored in the resource record as a reliability contribution attributable to the resource. At decision block 1112, the resource manager determines whether additional resources remain to be processed. If additional resources remain to be processed, execution returns to block 1104, where a resource pool identified with the next resource is identified. If there are no additional resources to be processed, execution advances to block 1114.

At block 1114, the resource manager adjusts the collections of resources allocated to the resource pools based on the reliability contributions of individual resources. In some examples, the resource manager identifies backup resources for which the associated reliability contribution is zero, and removes the backup resources from the resource pool. In some implementations, backup resources for which the associated reliability contribution is zero are freed for use by other applications or services. In yet another example, the resource manager identifies unassigned resources that have a greater potential reliability contribution than resources assigned to a resource pool and swaps the unassigned resources for existing resources assigned to the resource pool. Means for adding or removing resources to and from the resource pool may be executable instructions or circuitry that, when executed by the processor, adds or removes and an identifier corresponding to the resource to or from a database containing resource-pool information. For example, the resource manager may retain identifiers that identify the resources in the resource pool in a database, linked list, or memory array that is accessible to the resource manager. In another example, the resource manager writes information describing the resources in a database such as a relational database, and adding and removing resources from the resource pool is accomplished by modifying the information retained in the database.

Figure 12:
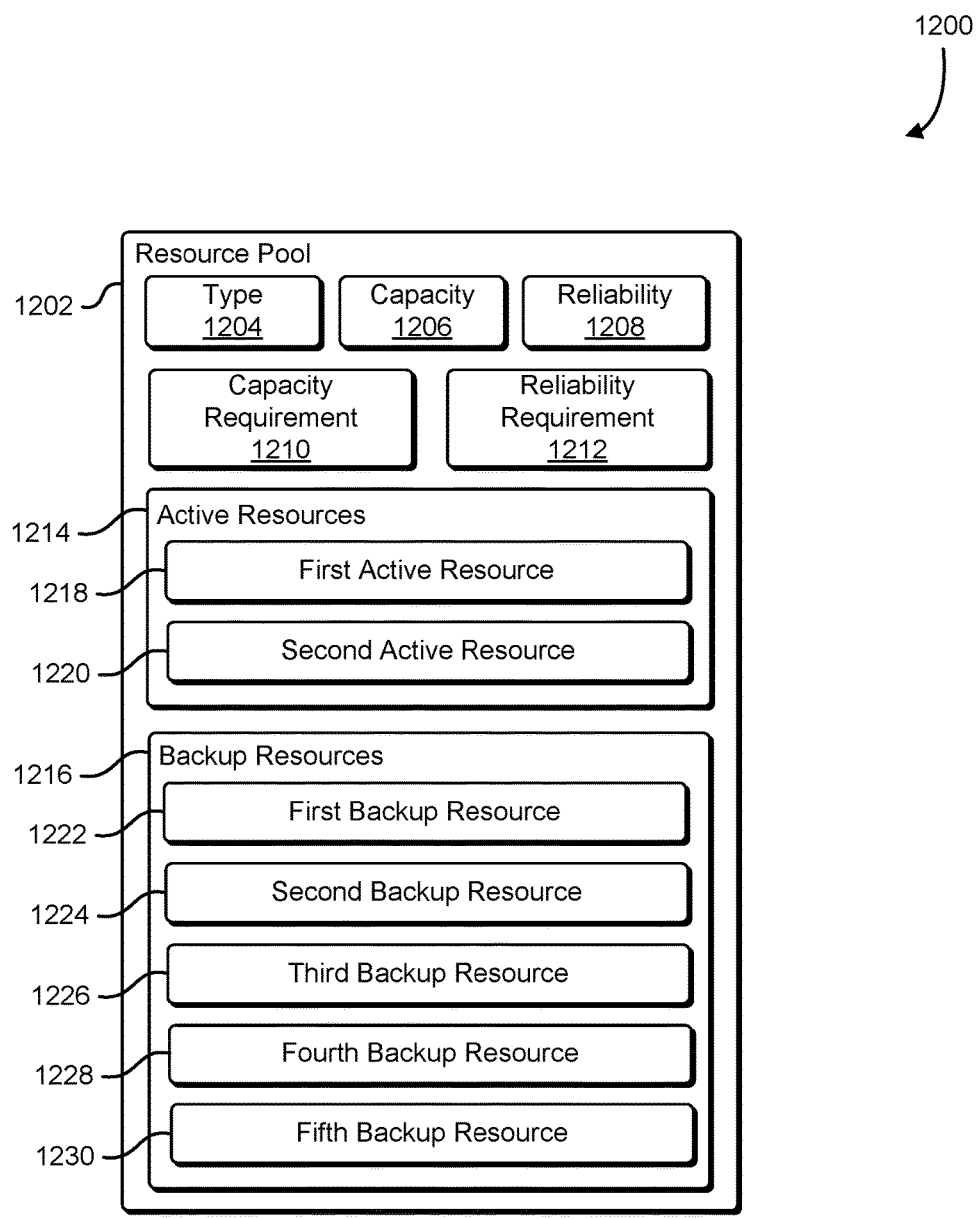
FIG. 12 shows an illustrative example of a resource pool that includes active resources and backup resources of a particular resource type.

FIG. 12 shows an illustrative example of a resource pool that includes active resources and backup resources of a particular resource type. A data diagram 1200 illustrates data associated with a resource pool 1202. The resource 1202 includes a type field 1204, a capacity field 1206, a reliability field 1208, a capacity requirement 1210, and a reliability requirement 1212. The type field 1204 specifies a type of resource retained in the resource pool 1202. In various examples, the type field 1204 may specify a memory type, a processing type, a disk storage type, a network type, or service type. The capacity field 1206 holds a value that represents the capability of the active resources in the resource pool 1202. In various examples, the capacity field 1202 may hold a value that represents an amount of storage, a processing rate, an amount of bandwidth, or a quota. The reliability field 1208 holds a value that represents the reliability of the resource pool 1202. The reliability of the resource pool indicates a likelihood that, in the event of a dependency failure, there will be sufficient resources in the resource pool 1202 to satisfy an application request. The capacity requirement field 1210 holds a capacity requirement for the resource pool 1202. The reliability requirement field 1212 holds a reliability requirement for the resource pool 1202.

The resource pool 1202 includes a set of active resources 1214. The set of active resources 1214 may include one or more resources that are maintained in an active state and are available for fulfilling application requests. In the example shown in FIG. 12, the set of active resources 1214 includes a first active resource 1218 and a second active resource 1220. The first active resource 1218 and the second active resource 1220 are resources of a type that matches a type indicated by the type field 1204.

The resource pool 1202 includes a set of backup resources 1216. The set of backup resources 1216 may include zero or more resources. Backup resources may be maintained in an active state, a suspended state, or hibernated state, and may be called upon by a resource manager to take the place of an active resource. The set of backup resources 1216 includes a first backup resource 1222, a second backup resource 1224, a third backup resource 1226, a fourth backup resource 1228, and a fifth backup resource 1230. The backup resources are resources of a type that matches the type indicated by type field 1204.

The resource pool 1202 may be created by a resource manager as a result of a request received by an application. The application specifies a capacity requirement which is stored in the capacity requirement field 1210, and a reliability requirement which is stored in the reliability requirement field 1212. Based at least in part on the capacity requirement, the resource manager identifies the first active resource 1218 and the second active resource 1220, and adds the active resources to the set of active resources 1214. Based at least in part on the reliability requirement, the resource manager identifies the first backup resource 1222, the second backup resource 1224, the third backup resource 1226, the fourth backup resource 1228, and the fifth backup resource 1230, and adds the backup resources to the set of backup resources 1216. The resource manager determines a capacity for the set of active resources 1214, and stores the determined capacity and the capacity field 1206. The resource manager determines a reliability for the set of backup resources 1216, and stores the determined reliability in the reliability field 1208.

Figure 13:
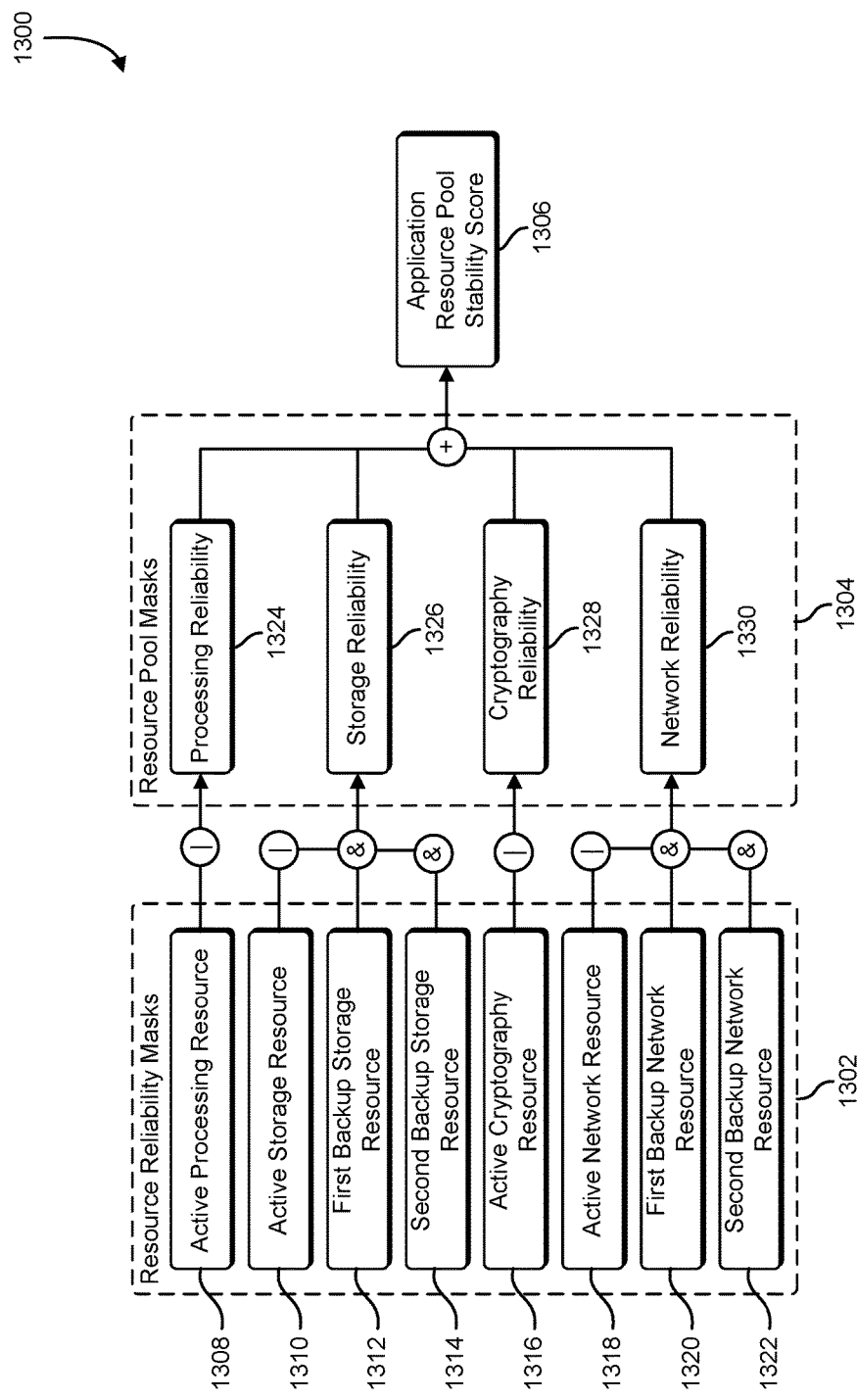
FIG. 13 shows an illustrative example of a set of components that are combined to generate a stability score for a resource pool.

FIG. 13 shows an illustrative example of a set of components that are combined to generate a stability score for a resource pool. A data diagram 1300 includes a set of resource reliability masks 1302 that are used to generate a set of resource pool masks 1304, and an application resource pool stability score 1306 that is generated from the set of resource pool masks 1304. The set of resource reliability masks 1302 includes an active processing resource mask 1308, an active storage resource mask 1310, a first backup storage resource mask 1312, a second backup storage resource mask 1314, an active cryptography resource mask 1316, an active network resource mask 1318, a first backup network resource mask 1320, and a second backup network resource mask 1322. Each resource mask in the set of resource reliability masks 1302 is a value with a different set bit, the bit representing the presence of the associated dependency.

In the example shown in FIG. 13, the set of resource reliability masks 1302 is combined to generate a processing reliability mask 1324, a storage reliability mask 1326, a cryptography reliability mask 1328, and a network reliability mask 1330. The active processing resource mask 1308 is copied to the processing reliability mask 1324. The active storage resource mask 1310, the first backup storage resource mask 1312, and the second backup storage resource mask 1314 are combined to produce the storage reliability mask 1326. The active cryptography resource mask 1316 is copied to the cryptography reliability mask 1328. The active network resource mask 1318, the first backup network resource mask 1320, and the second backup network resource mask 1322 are combined to produce the network reliability mask 1330.

The processing reliability mask 1324, the storage reliability mask 1326, the cryptography reliability mask 1328, and the network reliability mask 1330, are combined to produce the application resource pool stability score 1306. In some examples, the resource pool masks 1304 are combined with a logical OR operation to identify the dependencies on which the application resource pool depends, and failure probabilities associated with the individual dependencies are used to determine the application resource pool stability score 1306.

Figure 14:
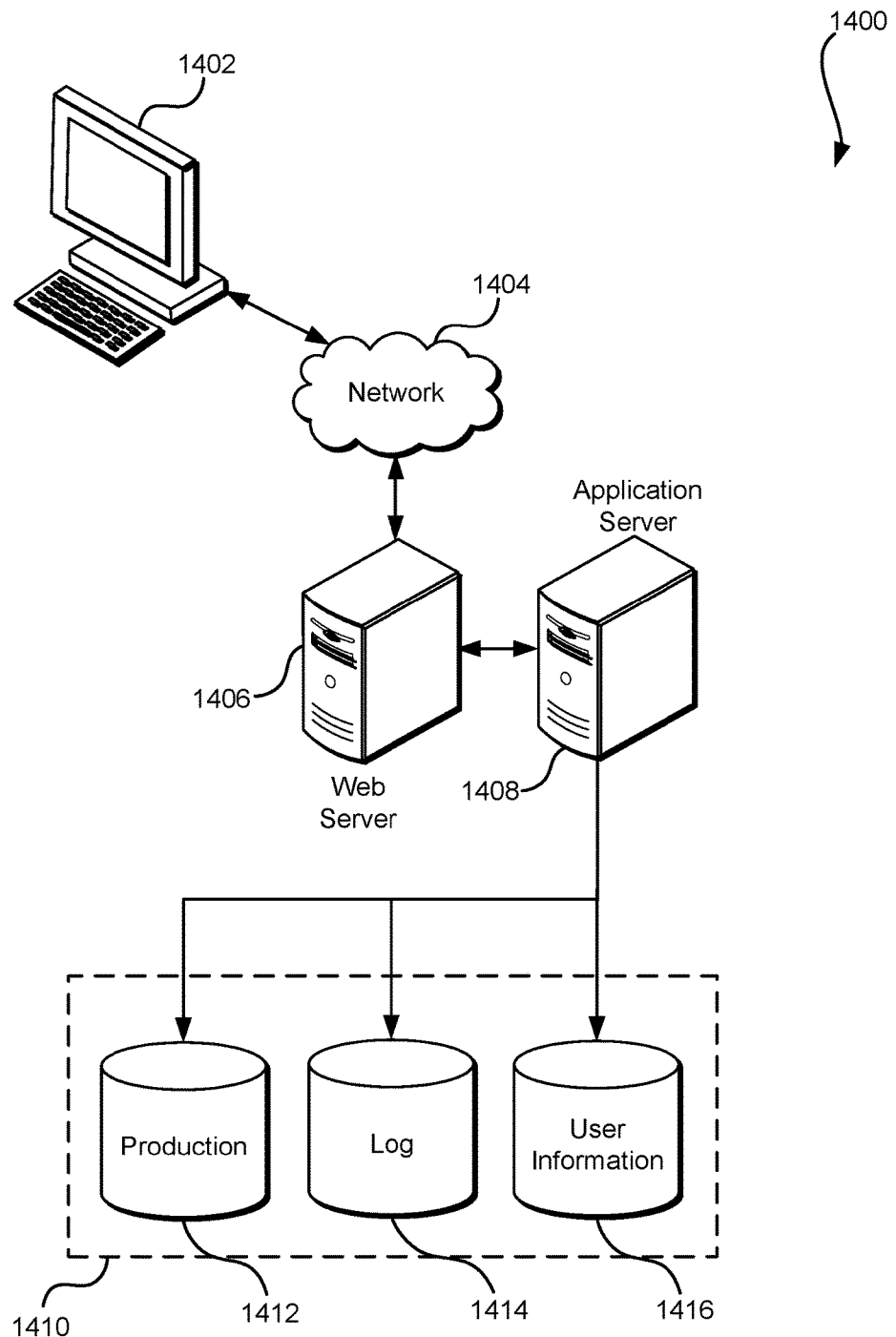
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes, and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   under control of a computer system configured with executable instructions,
      allocating a set of resources to a resource pool managed by the computer system, the set of resources including at least one active resource assigned to perform a task, and at least one backup resource capable of performing the assigned task;
      acquiring a reliability parameter for the resource pool, the reliability parameter indicating a minimum likelihood that the resources in the resource pool will include resources capable of performing the assigned task at a future time;
      acquiring reliability information associated with individual resources in the set of resources by at least producing a set of reliability indicators by determining an indicator of reliability for each dependency in a set of dependencies associated with a particular resource in the set of resources and combining the set of reliability indicators to produce a reliability metric for the particular resource, the reliability information associated with the particular resource indicating a likelihood that the particular resource will be able to perform the assigned task at the future time and the reliability information based at least in part on combined reliability indicators of a set of dependencies associated with the particular resource;
      determining, based at least in part on reliability information associated with individual resources in the set of resources, a reliability score for the resource pool, the reliability score indicating a likelihood that the resources in the resource pool will include resources capable of performing the assigned task at the future time;
      comparing the reliability parameter of the resource pool to the reliability score for the resource pool to produce a comparison result that indicates whether the reliability parameter is met by the resources in the resource pool; and
      modifying the allocation of resources to the resource pool based on the comparison result.

2. The computer-implemented method of claim 1, further comprising:
   determining that the reliability parameter of the resource pool is not satisfied; and
   as a result of having determined that the reliability parameter of the resource pool is not satisfied, allocating an additional backup resource to the resource pool.

3. The computer-implemented method of claim 1, wherein acquiring reliability information of individual resources is further accomplished at least in part by:
   identifying, for the particular resource in the set of resources, a set of dependencies associated with the particular resource.

4. The computer-implemented method of claim 3, wherein:
   the indicator of reliability is a dependency mask, the dependency mask is a bit field, and individual set bits in the bit field represent individual dependencies in the set of dependencies; and
   the reliability score of the resource pool is determined at least in part by identifying shared dependencies of backup resources allocated to the resource pool.

5. A system, comprising at least one physical computing device that implements a resource manager, wherein the resource manager:
   identifies a set of active resources sufficient to meet a capacity parameter accessible to the resource manager based at least in part on combined reliability indicators of a set of dependencies associated with resources of the set of active resources;
   identifies a set of backup resources that, when added to the set of active resources, satisfies a reliability parameter accessible to the resource manager, the reliability parameter being a value that represents a likelihood that the resource manager will be able to fulfill a request for resources, where identifying satisfaction of the reliability parameter includes:
      determining a combined reliability score for a combination of the set of active resources and an additional resource pool that includes an additional set of active resources, the determining based at least in part on a reliability score for the set of active resources and an additional reliability score for the additional resource pool; and
      comparing the combined reliability score to the reliability parameter;
   receives a request for resources from a requester; and
   in response to the request, provides at least one resource from the set of active resources to the requester.

6. The system of claim 5, wherein:
   the set of active resources holds resources of a first type and the capacity parameter is a parameter for a first type of resource; and
   the resource manager further:
      identifies the additional set of active resources of a second type sufficient to meet an additional capacity parameter provided to the resource manager, the additional capacity parameter being a parameter for a second type of resource different than the first type of resource;
      generates the additional resource pool that includes the additional set of active resources;
      identifies an additional set of backup resources that, when added to the additional resource pool, causes the additional resource pool to satisfy the reliability parameter provided to the resource manager;
      adds the additional set of backup resources to the additional resource pool; and
      in response to the request, provides at least one resource from the additional resource pool to the requester.

7. The system of claim 5, wherein:
   the resource manager further determines that the reliability parameter is satisfied by:
      determining a reliability score for the set of active resources;
      determining an additional reliability score for the additional resource pool.

8. The system of claim 5, wherein the resource manager further:

determines that the set of active resources is not sufficient to meet the capacity parameter provided to the resource manager; and as a result of having determined that the set of active resources is not sufficient, moving a resource from the set of backup resources to the set of active resources.

9. The system of claim 8, wherein the resource manager further:

determines whether the set of active resources satisfies the reliability parameter provided to the resource manager; and as a result of determining that the set of active resources no longer satisfies the reliability parameter, adds at least one backup resource to the set of active resources, causing the set of active resources to meet the reliability parameter.

10. The system of claim 5, wherein:

the set of active resources includes more than one active resource; and the resource manager determines the reliability of the set of active resources at least in part by determining a union of dependencies of individual resources in the set of active resources.

11. The system of claim 5, wherein the resource manager further:

determines that presence of a particular backup resource in the set of active resources does not contribute to the reliability of the set of active resources; and as a result of having determined that presence of the particular backup resource does not contribute, remove the particular backup resource from the set of active resources.

12. The system of claim 5, wherein the resource manager identifies the set of backup resources in part by:

determining a potential change in resource-pool reliability caused by adding each individual resource of a set of available resources to the set of active resources;

identifying a particular resource from the set of available resources, the particular resource associated with the greatest potential change in resource-pool reliability; and adding the particular resource to the set of active resources.

13. A system, comprising at least one computing device that implements a resource manager, the at least one computing device comprising at least one processor, the resource manager:

identifying a first set of resources sufficient to meet a capacity parameter provided to the resource manager;

generating a resource pool that includes the first set of resources as active resources;

identifying a second set of resources that, when added to the resource pool as backup resources, causes the resource pool to satisfy a reliability parameter provided to the resource manager based at least in part on a reliability parameter associated with a combined reliability probability of the first set of resources and of the second set of resources, the identifying the second set of resources including determining that the resource pool satisfies the reliability parameter based on a combination of a first probability that the first set of resources will not meet the reliability parameter and a second probability that the second set of resources will be available when the first set of resources fails; and adding the second set of resources to the resource pool.

14. The system of claim 13, the resource manager further comprising an application programming interface that allows an administrator operating resource management console to provide, to the resource manager, the reliability parameter.

15. The system of claim 13, wherein the identifying the first set of resources includes configuring a computing device to:

determine capacity scores for individual available resources in a the set of available resources; and select a one or more resources from the set of available resources, the one or more resources having an associated total capacity score that satisfies the capacity parameter.

16. The system of claim 13, wherein the identifying the second set of resources includes configuring a computing device to:

determine the first probability that the first set of resources will not meet the reliability parameter; and determine the second probability that the second set of resources will be available when the first set of resources fails.

17. The system of claim 13, wherein the resource manager is configured to:

receive a request from an application;

identify resources sufficient to satisfy the request; and cause the request to be fulfilled using the identified resources.

18. The system of claim 13, wherein the identifying the second set of resources includes configuring a computing device to:

determine, for each resource in a set of available resources, a reliability contribution that is based on a set of dependencies associated with the first set of resources; and add a resource from the set of available resources to the second set of resources based at least in part on the reliability contribution of the resource.

19. The system of claim 13, wherein the identifying the second set of resources includes configuring a computing device to:

determine a set of active dependencies associated with the first set of resources;

identify a set of backup resources capable of replacing the first set of resources;

determine a set of backup dependencies associated with the set of backup resources;

determine that at least one dependency in the set of active dependencies is not in the set of backup dependencies; and as a result of having determined at least one dependency in the set of active dependencies is not in the set of backup dependencies, adding the set of backup resources to the second set of resources.

20. The system of claim 13, wherein the resource manager further determines an order of backup resources in the resource pool.

* * * * *